United States Patent [19]

Gray

[11] Patent Number: 5,138,155

[45] Date of Patent: Aug. 11, 1992

[54] PRESSURE GAUGE WITH FIBER OPTIC SENSOR

[75] Inventor: Tommy L. Gray, Dallas, Tex.

[73] Assignee: Span Instruments, Inc., Plano, Tex.

[21] Appl. No.: 655,191

[22] Filed: Feb. 13, 1991

Related U.S. Application Data

[63] Continuation of Ser. No. 309,234, Feb. 13, 1989, abandoned.

[51] Int. Cl.⁵ ............................................. G01D 5/34
[52] U.S. Cl. ................................. 250/231.19; 73/705; 250/227.21
[58] Field of Search ............... 250/231 P, 227, 227.14, 250/231.19, 227.21; 73/735, 722, 728, 705, 736

[56] References Cited

U.S. PATENT DOCUMENTS

| | | |
|---|---|---|
| 3,067,617 | 12/1962 | Buck . |
| 3,538,772 | 11/1970 | Filloux . |
| 3,587,321 | 6/1971 | Couch et al. . |
| 3,707,868 | 1/1973 | Fruit . |
| 3,741,015 | 6/1973 | Moss, Jr. et al. . |
| 3,742,233 | 6/1973 | Gorgens et al. ................ 250/231 R |
| 3,915,009 | 10/1975 | Worden et al. . |
| 4,323,741 | 4/1982 | Krohn .................................. 73/736 |
| 4,387,600 | 6/1983 | Kranz . |
| 4,502,336 | 3/1985 | Dudash et al. ..................... 73/736 |
| 4,538,063 | 8/1985 | Bulat ................................ 250/231 P |
| 4,611,600 | 9/1986 | Cohen . |
| 4,620,093 | 10/1986 | Barkhoudarian et al. . |
| 4,626,680 | 12/1986 | Martens et al. . |
| 4,631,401 | 12/1986 | Parkhurst et al. . |
| 4,659,923 | 4/1987 | Hicks, Jr. . |
| 4,667,097 | 5/1987 | Fasching et al. . |
| 4,670,649 | 6/1987 | Senior et al. . |
| 4,678,902 | 7/1987 | Perlin . |
| 4,678,905 | 7/1987 | Phillips . |
| 4,678,909 | 7/1987 | Jackson et al. . |
| 4,687,927 | 8/1987 | Iwamoto et al. ................. 250/231 P |
| 4,691,708 | 9/1987 | Kane . |
| 4,856,317 | 8/1989 | Pidorenko et al. ..................... 73/705 |

Primary Examiner—David C. Nelms
Attorney, Agent, or Firm—Harold E. Meier

[57] ABSTRACT

A pressure responsive apparatus having a flow-through element provides indications of measured pressure. The apparatus preferably includes a pressure gauge having a flow-through Bourdon tube responsive to an external pressure. The flow-through Bourdon tube drives a conventional pointer indicator and further supports a reflective target that is positioned in response to pressure applied to the Bourdon tube. Light is transmitted to the target by means of fiber optic cables from a remotely positioned oscillator. Light is reflected by the target and transmitted by fiber optic cables to processing circuitry that responds to reflected light signals as generated by the oscillator. To generate these light signals, light emitting diodes form a light source and the light signals are detected by means of phototransistors. A reference target is also provided along with a second light source/light detector pair. The processing circuitry responds to the outputs of the phototransistors and generates a controller output by use of a look-up table.

9 Claims, 2 Drawing Sheets

PRESSURE GAUGE WITH FIBER OPTIC SENSOR

This application is a continuation of Ser. No. 309,234 filed Feb. 13, 1989, now abandoned.

TECHNICAL FIELD

This invention relates to condition responsive devices and, more particularly, to a pressure monitoring apparatus incorporating a flow through element, a light source and a light detector along with a look-up table and associate electronic circuitry for generating an indication of measured pressures.

BACKGROUND OF THE INVENTION

Condition responsive devices which provide an indication or control a selected operation in response thereto, are well known in the prior art. Such devices have been used in many diverse environments. For example, it is known in the prior art to connect a pressure sensitive element, such as a Bourdon tube, to a source of external pressure, whereby in operation the tube is deflected by an amount proportional to the sensed pressure variations. The mechanical deflection of the Bourdon tube is transduced into a mechanical output to provide an indication of the pressure in the tube or, alternatively, to control a physical operation. An apparatus of this type is shown in U.S. Pat. No. 4,502,334 and in U.S. Pat. No. 3,742,233, the latter describing a transducer for converting the motion of a Bourdon tube into a digital electrical signal.

Although such condition responsive devices have proven generally effective for indicating a condition or controlling an operation in response to a change in the condition, such devices may not be acceptable for providing the necessary degree of safety required in certain atmospheric conditions. For example, the use of the device such as described in U.S. Pat. No. 3,742,233 requires the installation of a light source at the pressure responsive element. This creates a condition for an electrically produced spark which in an explosive atmosphere would have disastrous results. In such applications where there is a potentially explosive environment, even a small electrically produced spark cannot be tolerated due to the potential of a disastrous explosion. Heretofore, compensation to minimize the potential of an explosion due to an electrically produced spark has required expensive and complicated instrumentation with its attendant high cost and potential unreliability.

Conventional C-shaped Bourdon tubes having one end closed are difficult to flush out and therefore have not been found acceptable for measurement of conditions in certain processes. The closed end construction is a disadvantage when it is desirable to measure conditions in a process wherein contaminants may impair the operation of the condition responsive element, such as the conventional C-shaped end Bourdon tube. As a result, Bourdon tube devices have not been widely utilized for measuring pressure and related phenomena where there is the potential for contaminating the Bourdon tube. The use of the closed end Bourdon tube has also been found objectionable in certain industrial processes wherein cleanliness is of paramount importance. The contaminants that build up in the closed end Bourdon tube have the potential for being flushed back into the process thereby contaminating the product. In the manufacture of semiconductor products for the electronics industry, this reverse contamination of the end product is of significant concern.

Accordingly, an advantage of the present invention is to provide a condition responsive apparatus having a flow through pressure sensitive element supporting the moving part of a transducer and operating in conjunction with a remote light source and a remote light detector coupled to the transducer by means of a fiber optic cable. The light detector inputs a signal to electronic circuits that employ a "look-up" table to characterize the apparatus output to follow the measured condition.

SUMMARY OF THE INVENTION

The present invention relates to an apparatus having a control member movable in response to a predetermined physical condition. In the preferred embodiment, the control member is a flow through pressure sensitive element, such as a double C-shaped Bourdon tube, which expands in response to an externally applied pressure. This pressure sensitive element drives a conventional mechanical mechanism and also positions a reflective target as a part of a motion transducer. Associated with the reflective target is a light source and light detector, along with electronic circuitry responsive to light pulses received by the light detector.

According to one embodiment of the invention, a reflective target is supported on the interconnection of two interconnected conventional C-shaped Bourdon tubes that respond to pressure variations. This reflective target is optically coupled to a light source and a light detector by means of first and second fiber optic cables. The first fiber optic cable transmits light from the light source to the reflective target and the second fiber optic cable transmits light reflected from the target to a control circuit. The control circuit is connected to the light detector and responds to the output thereof to generate an indication of pressure applied to the pressure responsive device.

In operation, the light source transmits light through the first fiber optic cable to the reflective target which is reflected thereby to the second fiber optic cable. The second fiber optic cable transmits the reflected light to the light detector which responds to the amplitude of reflected light to generate an output that is amplified and conditioned in the control circuit to actuate an indicator or control element.

In accordance with a more specific embodiment of the invention, there is provided a pressure responsive controller that is optically coupled to a pressure responsive device. A first light source/light detector pair and a second light source/light detector pair are remotely located from the pressure responsive device. A first fiber optic cable transmits light from the light source of the first pair to a reflective target at the pressure responsive device, and a second fiber optic cable transmits light reflected at the target from the light source to the light detector of the first pair. In similar fashion, a third fiber optic cable transmits light from the light source of the second pair to a reference target positioned at the pressure responsive device, and a fourth fiber optic cable transmits light reflected from the reference target from the light source to the light detector of the second pair. Connected to the light detector of the first pair is a first control circuit that responds to the output of the light detector to generate an indication of pressure change applied to the pressure responsive device. Connected to the light detector of the second pair and responsive to the output thereof is a second control circuit for generating a feedback reference. The output of the first control circuit generates a corrected indication of pressure change at the pressure responsive element.

An extension of the invention as described in the previous paragraph includes a characterizing circuit that includes a "look-up" table. The corrected indication of pressure change is an address to the look-up table to provide an output of the characterizing circuit that varies with the pressure applied to the responsive element, for example, a linear relationship between the output and measured pressure. Although the invention is described using a two light source/light detector pair embodiment, it should be understood that the invention is not so limited.

Accordingly, the condition responsive apparatus of the present invention overcomes several disadvantages associated with similar devices heretofore available; particularly, the potential for contamination using the conventional closed end pressure responsive element and the failure of such art devices to enable the elimination of electrically generated sparks at the condition responsive apparatus by the remote location of a light source and a light detector. In the present invention, such operation is provided by means of a flow through pressure responsive element and fiber optic cables for remotely mounting a light source and a light detector and associated circuitry for processing the output of the light detector to provide an indication of pressure conditions.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
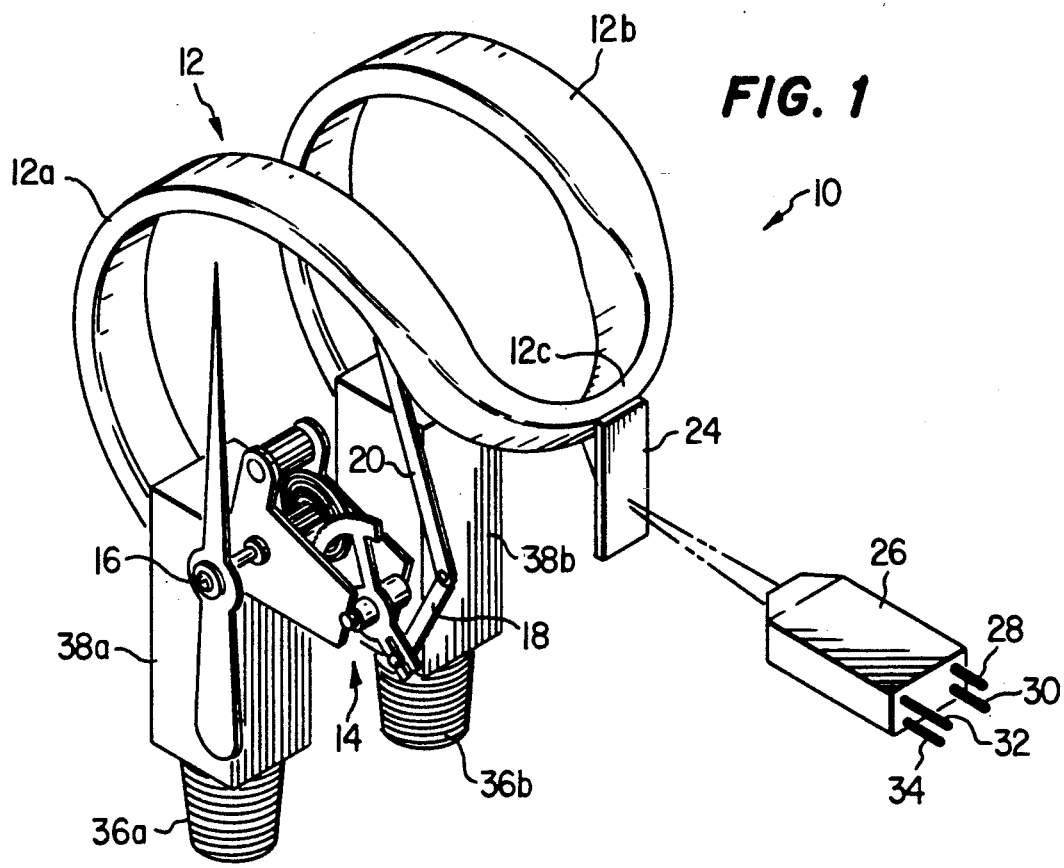
FIG. 1 is a perspective view of a flow through double C-shaped Bourdon tube pressure responsive device driving a rotatable shaft and supporting a reflective target.
Figure 2:
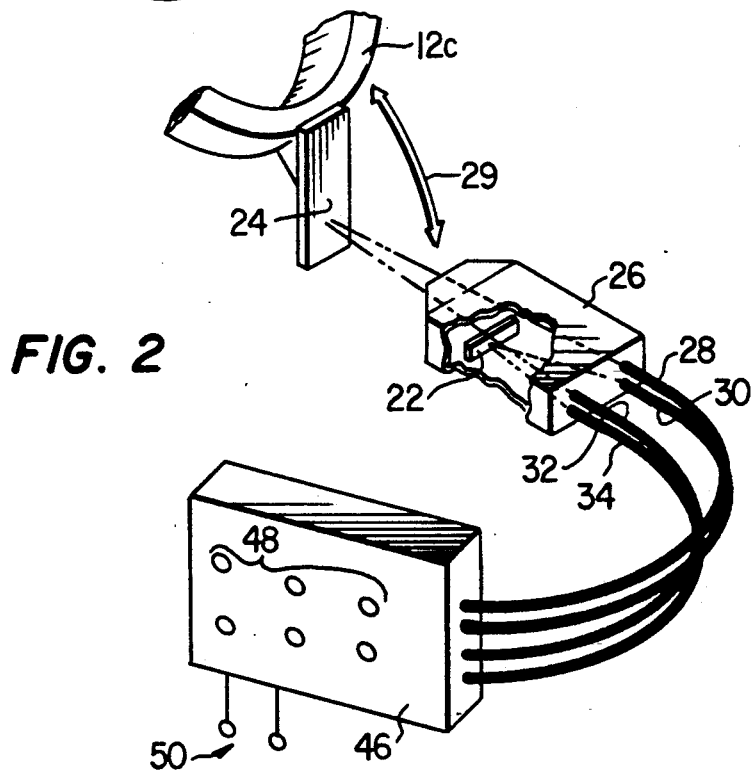
FIG. 2 is a perspective view of remote circuitry connected by means of fiber optic cables to the pressure responsive device of FIG. 1 with the ends of the fiber optic cables terminating at the reflective target and a reference target.

Referring now to the drawings wherein like reference characters designate like or similar parts throughout the several views, FIG. 1 is a perspective view of a pressure gauge 10 of a condition responsive apparatus including a Bourdon tube 12 having two interconnected C-shaped tubes 12a and 12b providing flow through pressure responsive operation. Reference is also made to FIG. 2 that is a partial view of the Bourdon tube 12 and shown interconnected to control circuitry. Attached to the interconnecting channel 12c of the Bourdon tube 12 is a reflective target 24. A somewhat conventional gear assembly 14 converts the motion of the Bourdon tube 12 into rotary motion as evidenced by movement of a shaft 16. The gear assembly 14 responds to movement of the Bourdon tube 12 by an interconnecting link 18 connected to an attaching bracket 20.

In accordance with a modification of conventional construction, the pressure gauge 10 includes conduits 36a and 36b that communicate with the C-shaped tubes 12a and 12b of the Bourdon tube 12 through mounting blocks 38a and 38b. Specifically, internal passages (not shown) within the mounting block 38a connect the conduit 36a to the C-shaped tube 12a, and internal passages (again not shown) within the mounting block 38b connect the conduit 36b to the C-shaped tube 12b.

Mounted to rotate with the interconnecting channel 12c, is the reflective target 24 having a light reflecting surface, as will be explained. The reflective target 24 is positioned in the light path from a sensor head 26 that includes an array of two (2) fiber optic cables 28 and 32 terminating flush with the face of the sensor head. Mounted within the sensor head 26, as shown in FIG. 2, is a reference target 22. The sensor head 26 also includes an array of two (2) fiber optic cables 30 and 34 with the light from the transmitting cable 30 directed toward the target 22.

In operation, light from the fiber optic cable 28 is reflected from the reflective target 24 to the fiber optic cable 32. Similarly, light from the fiber optic cable 30 is reflected from the reference target 22 to the fiber optic cable 34. To minimize to the extent possible any potential explosive spark being generated at the pressure gauge 10, all electrical current carry components are removed from the location of the pressure gauge to a remote safe environment.

Specifically with reference to the reflective target 24, as the interconnection 12c rotates in an arc as indicated by the arrow 29, the distance between the fiber optic cables 28 and 32 and target 24 increases and decreases in accordance with variations of pressure applied to the Bourdon tube 12. The movement of the reflective target 24 toward or away from the ends of the fiber optic cables 28 and 32 varies the amount of light transmitted from the fiber optic cable 28 to the target 24 and reflected therefrom to the fiber optic cable 32. The magnitude of reflected light is thus a measure of applied pressure to the Bourdon tube 12.

Considering next the operation of the reference target 22, this is in a fixed position and thus provides a fixed reflective surface between the ends of the fiber optic cables 30 and 34. The amount of light reflected from the fiber optic cable 30 to the fiber optic cable 34 is fixed and depends on the distance between the reference target 22 and the ends of the cables 30 and 34 in addition to the surrounding environment, which environment is the same as that surrounding the reflective target 24. The operation of the reference target 22 not only provides a reference in the environment in which the reflective target 24 is found, but also minimizes the effect of any transmission irregularities in the fiber optic cables 28 and 32. That is, since the fiber optic cables 28, 30, 32 and 34 are all physically positioned together, the effect of any variation in light transmitted or reflected through these cables will be minimized.

As illustrated in FIG. 2, the fiber optic cables 28, 30, 32 and 34 are coupled to a controller 46 that includes circuitry for generating light to the fiber optic cables 28 and 30 and also circuitry for responding to light reflected from the reflective target 24 and the reference target 22 to the fiber optic cables 32 and 34, respectively. As illustrated, the controller 46 includes a display indicator 48 and connected thereto are output lines 50 providing signals indicating the pressure applied to the Bourdon tube 12. The controller 46 is located remote from the pressure gauge 10, thus removing the potential for electrical sparks generated at the pressure gauge which may be mounted in an explosive environment.

In addition to the advantage of removing the potential for electrical generated sparks at the pressure gauge 10, the apparatus of the present invention utilizes a flow through pressure responsive element to minimize contamination of the apparatus itself and also back flow contamination of a process to which the apparatus of this invention is connected.

Figure 3:
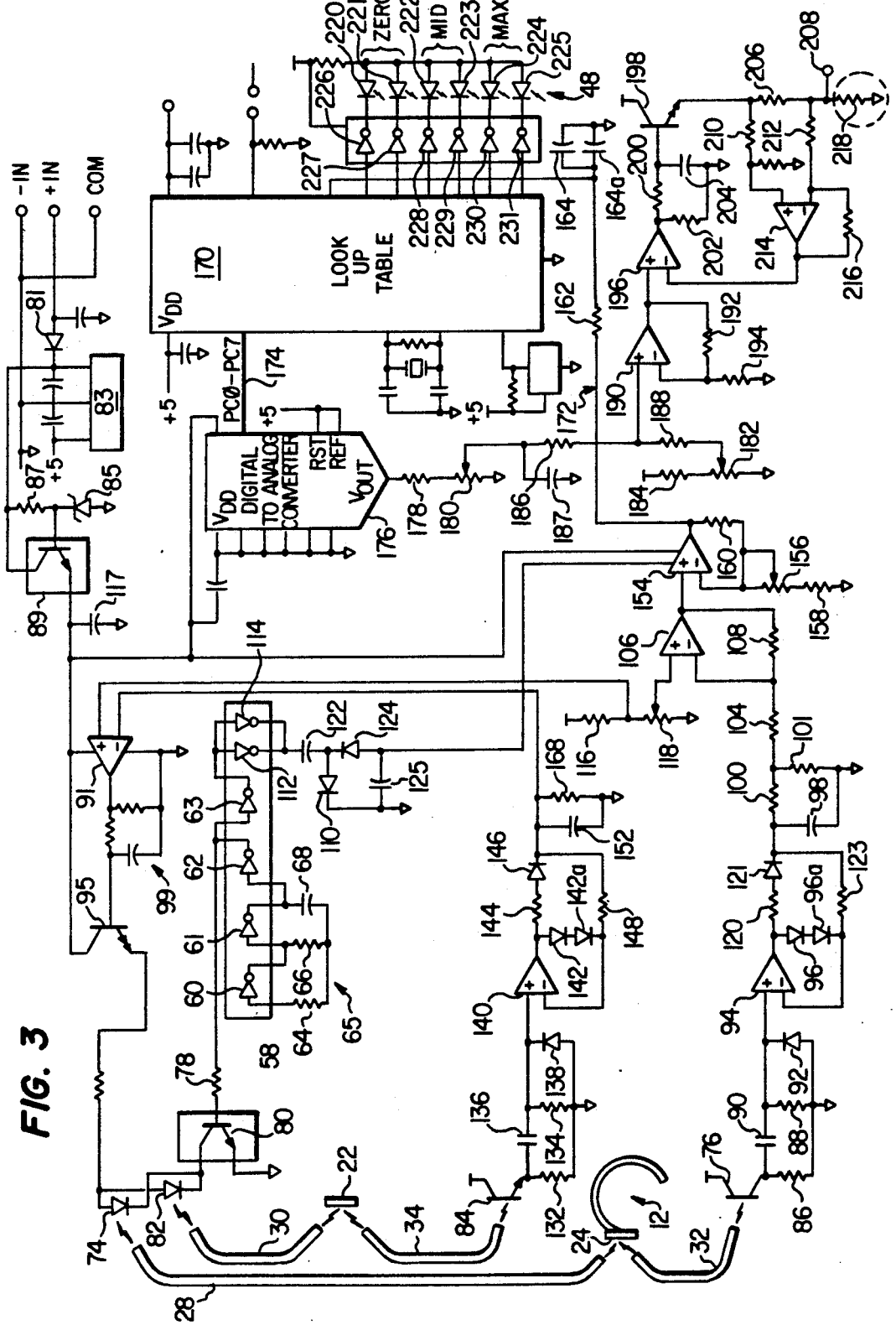
FIG. 3 is a schematic diagram of a control circuit for driving a light source and responding to the output of a light detector to generate pressure related indications and/or drive control signals.

Referring to FIG. 3, there is shown a schematic of a circuit for providing light to the sensor head 26 and also circuitry for responding to light reflected from the reflective target 24 and the reference target 22 to the controller 46.

In addition to the circuit for the controller 46 there is also illustrated in FIG. 3 the fiber optic cables 28, 30, 32 and 34 and a schematic representation of the targets 22 and 24. The controller circuit has four basic components including an oscillator circuit 58, a first circuit for processing a pressure varying signal from the reflective target 24, a second circuit for processing a reference signal from the reference target 22, and a circuit responsive to the pressure varying signal to generate a detector voltage as an address to a look-up table. The oscillator circuit 58 includes four inverter amplifiers 60–63 and a resistor/capacitor feedback circuit 65 for establishing the frequency of operation. With reference to the feedback circuit 65, it includes resistors 64 and 66 and a capacitor 68. In one implementation of the oscillator 58, the amplifiers 60-63 were part of a 14049 chip with the resistance/capacitance network connected to the terminals as illustrated.

One output of the oscillator 58 is applied through a base resistor 78 to a driver transistor 80 for controlling a light emitting diode 74 as part of a first light source/light detector pair that includes a phototransistor 76. This output of the oscillator is also applied to the driver transistor 80 for controlling a light emitting diode 82. The light emitting diode 82 is part of a second light source/light detector pair that includes a phototransistor 84. In one implementation of the circuit of FIG. 3, the light emitting diodes 74 and 82 emitted infrared radiation although it would be understood that visible radiation emitting diodes may be used.

Also applied to the light emitting diodes 74 and 82 is a reference current source including temperature compensating elements. An external power source is coupled through a diode 81 to a voltage regulator chip 83 at the input terminal. Typically, the regulator chip is a LM7805 chip available from several sources.

The output of the chip 83 is applied to a regulator transistor 89 having a base electrode connected to a Zener diode 85. Also tied to the base electrode of the transistor 89 is a drive resistor 87 interconnected to the cathode of the diode 81. While the drawing illustrates the output of the transistor 89 connected only to a differential amplifier 91, a transistor 95 and a filter capacitor 117, this voltage is also utilized as the voltage supply to other amplifiers of the circuit of FIG. 3.

With reference to the differential amplifier 91, this amplifier has one input terminal tied to the output of the control circuit responsive to the output of the phototransistor 84 and a second input from a resistor network consisting of resistors 116 and 118. An output of the amplifier 91 is connected through an RC network 99 to the base electrode of the Darlington transistor 95.

Operationally, the amplifier 91 and the transistor 95 function to adjust the voltage applied to the light emitting diodes 74 and 82 in accordance with the output of the phototransistor 84. That is, the voltage applied to the light emitting diode 74 and therefore, the light output thereof, as applied to the reflective target 24 varies with the output of the phototransistor 84. Since this transistor receives light transmitted from the reference target 22, this circuit consisting of the amplifier 91 and the Darlington transistor 95 functions to adjust the reference voltage driving the phototransistor 94 to minimize effects of the transmission of light from the light emitting diode 74 to the reflective target 24 and then to the phototransistor 76.

Light from the diode 74 is transmitted through the fiber optic cable 28 to the reflective target 24 and reflected therefrom by means of the fiber optic cable 32 to the phototransistor 76. Similarly, light emitted from the diode 82 is transmitted by the fiber optic cable 30 to the reference target 22 and reflected therefrom by means of the fiber optic cable 34 to the phototransistor 84. Each of the phototransistors 76 and 84 when responding to light from the respective diode by means of the respective targets 22 and 24 generates a signal periodically varying as the output of the oscillator 58. Thus, if the output of the oscillator 58 is a 300Hz square wave, then the signal generated by each of the phototransistors 76 and 84 will also be a 300Hz square wave.

Referring to that portion of the circuit of FIG. 3 responding to the pressure applied to the Bourdon tube 12, the phototransistor 76 is connected to an A.C. coupling network including resistors 86 and 88, a capacitor 90 and a diode 92. This network passes the 300Hz square wave and filters out all steady state signals that might be generated by the phototransistor 76 as a result of extraneous light being picked up by the fiber optic cable 32 at the sensor head 26. Thus, only a time varying signal at the output of the phototransistor 76 will be passed through the A.C. coupling network. Signals passing through the coupling network are applied to an amplifier 94 having an output connected to a diode pair 96 and 96a, a resistor 120, a diode 121 and a resistor 123 as a feedback circuit for the amplifier 94. The diode 121 in turn is connected to an RC filter network consisting of capacitor 98 and resistors 100 and 101. This RC network is designed to filter the output of the amplifier 94 to pass only a D.C. signal to the next amplifier stage for subsequent signal processing.

This subsequent signal processing includes a differential amplifier 106 connected through a resistor 104 to the interconnection of the resistors 100 and 101. The amplifier 106 is connected as a differential amplifier having a second input connected to the wiper arm of resistor 118. Functionally, the resistor 118 provides a means for setting the "zero" pressure level applied to the Bourdon tube 12. The amplifier 106 includes a feedback resistor 108.

Amplifier 140 provides the reference voltage to be differentially compared at the amplifier 91 to adjust the voltage applied to the light emitting diodes 74 and 82. Light from the diode 82 is transmitted through the fiber optic cable 30 and reflected by the reference target 22 to be transmitted by means of the fiber optic cable 34 to the phototransistor 84. An output of the phototransistor 84 is applied to an A.C. coupling network consisting of resistors 132 and 134, capacitor 136 and a diode 138. Operation of this coupling network is the same as the A.C. coupling network connected to the phototransistor 76. All steady state signals from the phototransistor 84 are blocked from input to the amplifier 140. This amplifier serves the same function as the amplifier 94 as previously described.

An output of the amplifier 140 is applied to a diode pair 142 and 142a, a resistor 144, a diode 146 and a resistor 148 as a part of a feedback network for the amplifier 140. Connected to the diode 146 is an RC filter consisting of a resistor 168 and a capacitor 152. This RC filter serves the same function as the RC filter in the pressure responsive side of the circuit and provides the reference voltage to the amplifier 91. By operation of the coupling network connected to the phototransistor 84 and the RC filter network at the output of the amplifier 140 the reference voltage from the light emitting diode 82 as reflected from the reference target 22 are input to the amplifier 91.

In operation of the amplifier 140 and the reference differential amplifier 91, light from the diode 82 that is reflected from the reference target 22 is transmitted by means of the fiber optic cable to the phototransistor 84. The output of the phototransistor 84 is amplified by the amplifier 140 and appears at the input of the differential amplifier 91. Thus, the input to the differential amplifier 91 varies with the level of light reflected by the target 22 to the phototransistor 84. This feedback from the reference target 22 directly controls the voltage applied to the light emitting diodes 74 and 82 to provide a reference light source to the reflective target 24.

With a zero pressure applied to the Bourdon tube 12, the position of the reflective target 24 with reference to the fiber optic cables 28 and 32 will produce a preset output from the buffer amplifier 94 as applied to the input of the amplifier 106. The resistor 118 is then adjusted such that the output of the differential amplifier 106 is zero indicating a zero pressure applied to the Bourdon tube 12. The circuit of FIG. 3 is now set up to generate an output at the amplifier 106 that varies with the pressure applied to the Bourdon tube 12.

An output of the differential amplifier 106 is applied to one input of a differential amplifier 154 that is designated as a gain setting network. The amplifier 154 includes a feedback network including a resistor 160 connected to a resistor network consisting of fixed resistor 158 in series with a variable resistor 156. The variable resistor 156 is adjusted to establish a maximum output from the amplifier 154 for the upper range of the pressure to be applied to the Bourdon tube 12. Procedurally, the zero adjust is first completed then the gain adjustment is made to finally set up the system for generating at the output of the amplifier 154 an indication of the pressure applied to the Bourdon tube 12.

An output of the amplifier 154 is applied to a filter network including an output resistor 162 and a capacitors 164 and 164a, the latter tied to system common. The output of the amplifier 154 at the interconnection between the resistor 162 and the capacitors 164 and 164a is the indication of pressure applied to the Bourdon tube 12.

Returning to the amplifiers 94, 106, 140 and 154, each of these amplifiers is part of a single "324" chip. The operating voltage for each of these amplifiers is provided at the output of the regulator transistor 89 having a base electrode connected to a Zener diode 85. While the drawing illustrates the output of the transistor 89 connected only to the amplifiers 91 and 154, as filtered by capacitor 117, this voltage is also utilized in the circuit for amplifiers 94, 106 and 140.

Also connected to the amplifier 154 is the output of the oscillator 58. The circuit interconnecting the oscillator 58 to the amplifier 154 includes two inverter amplifiers 112 and 114 as part of the 14049 chip. These two inverter amplifiers have interconnected outputs applied through a coupling capacitor 122 to a diode network including diodes 110 and 124. Also forming a part of the diode network is a capacitor 125.

Returning to the output of the amplifier 154, while this output varies with the pressure applied to the Bourdon tube 12, the variation with pressure is not linear. To characterize this voltage to vary linearly with pressure, the output of the amplifier 154 is applied to a look-up table 170 that typically may comprise an MC68HC11A1 chip. The look-up table is configured such that for a given input voltage applied on line 172 from the output of the amplifier 154 there will be provided a preset digital output on lines 174. This output is an eight bit signal connected to a digital-to-analog converter 176 that typically may be an AD7224LN chip. Both the look-up table 170 and the digital-to-analog converter 176 are provided with conventional drive voltages for operation of these circuits.

An analog output of the converter 176 is applied to a range setting network consisting of a resistor 178 in series with a variable resistor 180. The range setting by means of the variable resistor 180 is a factory procedure that is made to determine the range of output voltage from the circuit of FIG. 3 for the range of pressures to be applied to the Bourdon tube 12. A voltage appearing at the wiper arm of the variable resistor 180 is added to the low end voltage of the selected range generated at the wiper arm of a variable resistor 182 as part of an adjustment network including a resistor 184. The voltage at the wiper arm of the resistor 180 and the resistor 182 are added through resistors 186 and 188 and applied to the positive input terminal of a differential amplifier 190. A capacitor 87 connected to the wiper arm of the resistor 180 and the resistor 186 couples the circuit to ground. A feedback circuit for the amplifier 190 includes resistors 192 and 194.

The output of the amplifier 190 now varies from a minimum value as set by the resistor 182 to a maximum value as set by the resistor 180. This output of the amplifier 190 is further amplified by a driver amplifier 196 having an output connected through a filter network to a driver transistor 198. The filter network consists of resistors 200 and 202 along with a capacitor 204. The driver transistor 198 comprises a Darlington pair having an output at the emitter electrode applied through a resistor 206 to an output terminal 208.

Also connected to the resistor 206 through resistors 210 and 212 is a differential amplifier 214. This amplifier, which includes a feedback resistor 216, generates a feedback voltage to the second input of the amplifier 196. This circuit including the amplifier 196 and the amplifier 214 generates an output at the terminal 208 that is a current signal varying from a first level for a zero pressure applied to the Bourdon tube 12 to a second level representing the maximum pressure applied to the Bourdon tube 12. This current signal varies substantially linear with pressure change by means of the look-up table 170.

As an alternative to a current signal at the terminal 208, a resistor 218 (shown in dotted format) is connected to the output terminal 208. This converts the current signal into a voltage signal varying from a first level for a zero pressure applied to the Bourdon tube 12 to a second level representing the maximum pressure applied to the Bourdon tube.

Also output from the look-up table 170 are digital signals for driving the system display 48 comprising light emitting diodes 220-225. These diodes are driven individually by outputs of inverter amplifiers 226-231 as part of a 7404 chip. The output of the look-up table 170 as applied to the inverter amplifiers 226-231 is a six bit binary signal that selectively illuminates the light emitting diodes 220-225. By observing the color pattern of "on" and "off" condition for the diodes 220-225 various pressures applied to the Bourdon tube 12 are identified. For example, when a zero pressure is applied to the Bourdon tube 12 the diode 220 will be "on" and the diodes 221-225 will be "off". The diodes 220 and 221 are part of the "zero pressure" display and function to indicate pressures between zero and 2 psi. The diodes 222 and 223 are considered to be "mid-range pressure" displays, for example, 126 psi, and are selectively "on" or "off" as the pressure varies plus or minus the mid-range value. For a "high-range pressure" indication, the diodes 224 and 225 are selectively "on" or "off". For a mid-range value of 126 psi and a high-range value of 250 psi, Table 1 shows the "on" and "off" pattern for the diodes 220-225. The display status table is as follows:

TABLE 1

| | LED ON/OFF STATUS | | |
|---|---|---|---|
| | DIGIT | GRN | RED |
| Zero Pressure | 0 | OFF | ON |
| Display | 1 | ON | OFF |
| | >2 | OFF | OFF |
| Mid-Range | <126 | OFF | OFF |
| Display | 126 | ON | OFF |
| | >126 | OFF | ON |
| High-Range | <251 | OFF | OFF |
| Display | 251 | ON | OFF |
| | >251 | OFF | ON |

By operation of the light emitting diodes 220-225 the circuit of FIG. 3 may be initially adjusted and monitored for proper operation.

The use of remote circuitry and fiber optic cables in conjunction with the reflective target 24 advantageously provides apparatus for indicating pressure levels in the Bourdon tube 12 with a minimum effect on the operation of the pressure gauge in its primary function of analog pressure indication.

It should be appreciated that although the above description has been directed to a condition responsive apparatus including a Bourdon tube pressure gauge, this description is not meant to be limiting. It is envisioned that the reflective target of FIG. 3 and its associated processing circuitry are useful in many condition responsive devices having a control member movable in response to a predetermined physical condition.

Although the invention is described in detail, it is to be clearly understood that the same is by way of illustration and example only and is not to be taken by way of limitation, the spirit and scope of the invention being limited only to the terms of the appended claims.

I claim:

1. A pressure responsive controller providing an output that varies substantially linearly with linear changes in pressure, comprising:
   a pressure responsive element randomly selected from available pressure responsive elements, and including a pressure detector that responds to changes in pressure in a characteristic substantially non-linear manner relative to a reference position in response to a linear pressure change,
   a transducer randomly selected from available transducers responsive to the motion of said pressure detector including means for generating a transducer output that varies non-linearly with the movement of the pressure detector in response to linear changes in the pressure applied to said pressure responsive element,
   circuit means responsive to the transducer output and generating a detector voltage that varies non-linearly with linear pressure changes, said generated detector voltage varying in a manner corresponding to movement of the detector of said pressure responsive element relative the reference position, and
   output means including a look-up table with a single set of controller outputs for receiving the non-linearly varying detector voltage generated by the randomly selected pressure responsive element and the responsive randomly selected transducer, and selecting from the single set of controller outputs of the look-up table in accordance with the received non-linearly varying detector voltage a sequence of controller outputs that varies substantially linearly with linear changes in pressure applied to said pressure responsive element.

2. A pressure responsive controller as set forth in claim 1 wherein the look-up table includes a controller output selected by said output means from the look-up table in accordance with a predetermined amplitude of the received detector voltage.

3. A pressure responsive controller as set forth in claim 2 wherein said output means further includes a converter for generating an analog signal from said selected controller output that varies substantially linearly with linear changes in the pressure applied to said pressure responsive element.

4. A pressure responsive controller as set forth in claim 1 wherein said output means further includes a display having a "zero pressure" indicator, a "mid-range pressure" indicator, and a "high-range pressure" indicator.

5. A pressure responsive controller providing an output that varies substantially linearly with linear changes in pressure, the controller optically coupled to a non-linear pressure responsive device, the pressure responsive device randomly selected from available pressure responsive devices, comprising:
   a first light source/light detector pair,
   a second light source/light detector pair,
   a reflective target mounted to the randomly selected non-linear pressure responsive device for non-linear movement in response to linear changes in pressure applied to the pressure responsive device,
   a reference target mounted in a fixed position in relation to the reflective target,
   a first fiber optic cable for transmitting light from the first light source to the reflective target,
   a second fiber optic cable for transmitting light reflected from the reflective target to the light detector of the first detector pair, the intensity of the reflected light varying in a manner corresponding with the non-linear movement of the reflective target,
   a third fiber optic cable for transmitting light from the light source of the second detector pair to the reference target, a fourth fiber optic cable for transmitting light reflected from the reference target to the light detector of the second detector pair, a first control circuit connected to the light detector of the first detector pair and responsive to the output thereof to generate a non-linear indication of the linearly varying pressure applied to the non-linear pressure responsive device, a second control circuit connected to the light detector of the second pair and responsive to the output thereof to generate a reference indication, circuit means responsive to the non-linear indication from said first control circuit and the reference indication from the second control circuit and generating a detector voltage that varies in a manner corresponding with the movement of the reflective target and varies non-linearly with the linearly varying pressure applied to the non-linear pressure responsive device; and output means including a look-up table with a single set of controller outputs for receiving the detector voltage and selecting from the single set of controller outputs of the look-up table in accordance with the detector voltage a sequence of controller outputs that varies substantially linearly with linear changes in applied pressure.

6. A pressure responsive controller as set forth in claim 5 wherein said look-up table includes a digital controller output selected by said output means from the look-up table in accordance with a predetermined amplitude of the received detector voltage.

7. A pressure responsive controller as set forth in claim 6 wherein said output means further includes a digital to analog converter for generating an analog controller output from the digital controller output that varies substantially linearly with linear changes in pressure applied to the non-linear pressure responsive device.

8. A pressure responsive controller providing an output that varies substantially linearly with linear changes in pressure as measured by a randomly selected pressure responsive device that responds with movement in a substantially non-linear manner relative to a reference position in response to a linear pressure change, comprising:

a light source/light detector pair, a reflective target mounted to the pressure responsive device and movable therewith, a first fiber optic cable for transmitting light from the light source to said reflective target, a second fiber optic cable for transmitting light reflected from the reflective target to the light detector of said pair, a control circuit connected to the light detector of said pair and responsive to the output thereof to generate a detector voltage that varies non-linearly with the non-linear movement of the reflective target, and means including a look-up table with a single set of controller outputs for any randomly selected pressure responsive element for receiving the non-linear detector voltage and selecting from the controller outputs of the look-up table in accordance with the detector voltage a sequence of controller outputs that varies substantially linearly with linear changes in pressure applied to said flow through pressure responsive device.

9. A pressure responsive controller as set forth in claim 8 wherein said look-up table includes a controller output selected by said output means, each controller output selected from the look-up table in accordance with a predetermined amplitude of the received detector voltage.

* * * * *